(12) United States Patent
Knecht

(10) Patent No.: US 8,872,457 B2
(45) Date of Patent: Oct. 28, 2014

(54) METHOD AND APPARATUS FOR DRIVING A POLYPHASE ELECTRONICALLY COMMUTATED ELECTRIC MACHINE AND A MOTOR SYSTEM

(75) Inventor: Gerhard Knecht, Iffezheim (DE)

(73) Assignee: Robert Bosch GmbH, Stuttgart (DE)

( * ) Notice: Subject to any disclaimer, the term of this patent is extended or adjusted under 35 U.S.C. 154(b) by 123 days.

(21) Appl. No.: 13/811,322

(22) PCT Filed: Jul. 8, 2011

(86) PCT No.: PCT/EP2011/061661
§ 371 (c)(1),
(2), (4) Date: Apr. 1, 2013

(87) PCT Pub. No.: WO2012/010445
PCT Pub. Date: Jan. 26, 2012

(65) Prior Publication Data
US 2013/0181647 A1    Jul. 18, 2013

(30) Foreign Application Priority Data

Jul. 20, 2010 (DE) .......................... 10 2010 031 566

(51) Int. Cl.
*H02P 6/00* (2006.01)
*H02P 6/16* (2006.01)
*H02P 6/08* (2006.01)
*H02P 6/18* (2006.01)

(52) U.S. Cl.
CPC ................ *H02P 6/182* (2013.01); *H02P 6/002* (2013.01); *H02P 6/085* (2013.01)

USPC ....................................................... 318/400.35

(58) Field of Classification Search
CPC ................................................. H02M 2001/385
USPC ....................................................... 318/400.35
See application file for complete search history.

(56) References Cited

U.S. PATENT DOCUMENTS

| | | |
|---|---|---|
| 5,493,189 A | 2/1996 | Ling et al. |
| 6,064,175 A | 5/2000 | Lee |
| 6,181,093 B1 | 1/2001 | Park et al. |
| 2007/0252542 A1 | 11/2007 | Gauthier et al. |

OTHER PUBLICATIONS

International Search Report for Application No. PCT/EP2011/061661 dated Oct. 24, 2012 (2 pages).

*Primary Examiner* — Erick Glass
(74) *Attorney, Agent, or Firm* — Michael Best & Friedrich LLP

(57) ABSTRACT

The invention relates to a method for operating an electronically commutated electric machine (2). Alternating phase voltage potentials are applied to the phase conductors of the electric machine (2) for commutation, said phase voltage potentials being generated by a pulse-width modulation so that the height of the applied phase voltage potential is determined by a duty cycle (TV) of the pulse width modulation. In order to determine an instant of a zero crossing of a current induced in a phase conductor, a blanking interval (AT) which represents a time slot, is provided, when no phase current potential is applied to the corresponding phase conductor. A first transition time slot (ÜT1) is provided prior to and/or after the blanking interval (AT) during which the progression of the applied phase voltage potential has a defined first gradient during.

8 Claims, 2 Drawing Sheets

METHOD AND APPARATUS FOR DRIVING A POLYPHASE ELECTRONICALLY COMMUTATED ELECTRIC MACHINE AND A MOTOR SYSTEM

BACKGROUND OF THE INVENTION

The present invention relates to electronically commutated electric machines, to which phase voltages are applied in order to drive the electric machine. Furthermore, the present invention relates to methods for sensorless detection of an armature position of the electric machine.

Polyphase electronically commutated electric machines, in particular synchronous motors, can be driven, for example, by providing a stator magnetic field which leads an excitation magnetic field produced by an armature. The stator magnetic field, in particular the direction and strength thereof, is produced by applying phase voltages to winding phases of the stator of the electric machine.

In order to be able to determine the lead of the stator magnetic field, knowledge of the armature position of the armature of the electric machine is required. Often, in the case of such electric machines, the armature position is determined without the use of sensors in order to save on a position sensor. One possible method consists in measuring the induced back-emf in the winding phases and determining the time of the zero crossing of said back-emf. The time of the zero crossing of the induced back-emf can be used for the determination of the armature position (back-emf method).

In order to measure the induced back-emf, it is necessary to ensure that no external voltage is applied to the respective winding phase. During driving of the electric machine with the aid of block commutation, however, a driving phase voltage is generally applied to the corresponding winding phase at any point in time, with the result that this sensorless method cannot be used or further measures are necessary for measuring the induced back-emf despite block commutation.

Therefore, when using block commutation, a driver circuit which generates phase voltages for driving the electric machine is generally driven in such a way that, in a time window in which the induced back-emf is intended to be measured, no external voltage is applied to the respective winding phase or the corresponding phase connection for the winding phase is switched so as to be freely floating, with the result that the induced back-emf can be measured. The time window in which a voltage potential or a phase voltage is not applied to the respective winding phase is referred to as a blanking interval and is selected such that the zero crossing of the induced back-emf is included. The time of the zero crossing of the induced back-emf can be uniquely associated with a determined armature position and used to determine the times of the switchover between drive patterns for application of the phase voltages to the winding phases of the electric machine.

In the case of continuous-operation machines such as pumps or fans, it is often sufficient, owing to limited demands being placed on dynamics, to detect only the zero crossing of the induced back-emf of a winding phase. There is therefore overall an inexpensive possibility for sensorless operation of such pumps and fans.

The converted block commutation and the provision of the blanking interval result in a high level of noise development, however, which arises as a result of the abrupt commutation changes/switchovers. The commutation changes result in changes in phase current with a relatively steep edge. The resultant torque ripple and radial force excitations result in clearly perceivable noise.

When using such electric machines in electric vehicles, the consideration of noise emission is important because the noise of the apparatuses which are equipped with such electric machines is more markedly perceivable in this case since this noise is no longer drowned out by a relatively loud internal combustion engine.

SUMMARY OF THE INVENTION

One object of the present invention is therefore to provide an electronically commutated electric machine which can be operated without the use of sensors and has a low degree of noise development.

In accordance with a first aspect, a method for operating an electronically commutated electric machine is provided. Alternating phase voltage potentials are applied to the winding phases of the electric machine for commutation, wherein the phase voltage potentials are generated by pulse width modulation, with the result that the level of the phase voltage potential applied is determined by a duty factor of the pulse width modulation. In order to determine a time for a zero crossing of a voltage induced in a winding phase, a blanking interval is provided, which represents a time window during which no phase voltage potential is applied to the corresponding winding phase, wherein, prior to and/or after the blanking interval, a first transition time period is provided, during which the profile of the applied phase voltage potential has a limited first gradient.

One concept of the present invention consists in providing, in the case of a blanking interval for measuring a time of a zero crossing of a voltage induced in a winding phase, commutation transitions for the changes in the phase voltage potentials for implementing the blanking interval which do not take place suddenly between the energization patterns but with a limited first gradient. Such "soft" commutation transitions considerably reduce the noise development of an electronically commutated electric machine operated in this way since the torque ripple and radial force excitations are reduced.

Furthermore, the phase voltage potential can have a linear profile in the transition region.

In accordance with an embodiment, the phase voltage potentials can be applied in accordance with block commutation, wherein, in the event of each change between phase voltage potentials during a second transition time period, the profile of the applied phase voltage potential has a limited second gradient.

Since, in the case of block commutation with such commutation transitions, however, there are no longer any time windows in which no (floating) phase voltage potential is applied to the respective winding phase in order to measure the induced back-emf, the blanking interval is provided at a commutation transition.

As a result of the softer commutation transitions both between the commutation transitions between the phase voltage potentials and with respect to the blanking interval, the controlled phase current no longer has a notable gradient, but has a relatively smooth profile and has a quasi-sinusoidal profile.

As a result, firstly a reduction in noise of electronically commutated electric machines and secondly the use of the back-emf method for realizing sensorless motor operation can be combined.

Provision can be made for the second gradient of the phase voltage potentials to have a smaller magnitude than the first gradient of the phase voltage potentials.

During the first transition time period, the profile of the phase voltage potential can start from a mid-voltage potential or can end at the mid-voltage potential, wherein the mid-voltage potential is determined as the mean value for the phase voltage potentials prior to and after the blanking interval provided with the transition time periods.

In accordance with a further aspect, an apparatus for operating an electronically commutated electric machine comprising a control unit is provided, which apparatus is designed:

to apply alternating phase voltage potentials to the winding phases of the electric machine for commutation, to generate the phase voltage potentials by pulse width modulation, with the result that the level of the applied phase voltage potential is determined by a duty factor of the pulse width modulation, to provide a blanking interval for determining a time of a zero crossing of a voltage induced in a winding phase, said blanking interval representing a time window during which no phase voltage potential is applied to the corresponding winding phase, and to provide a first transition time period prior to and/or after the blanking interval, during which first transition time period the profile of the applied phase voltage potential has a limited first gradient.

In accordance with a further aspect, a motor system comprising an electronically commutated electric machine and comprising the above apparatus is provided.

In accordance with a further aspect, a computer program product is provided with contains a program code which, when it is run on a data processing device, implements the above method.

BRIEF DESCRIPTION OF THE DRAWINGS

Preferred embodiments of the present invention will be explained in more detail below with reference to the attached drawings, in which.

DETAILED DESCRIPTION

Figure 1:
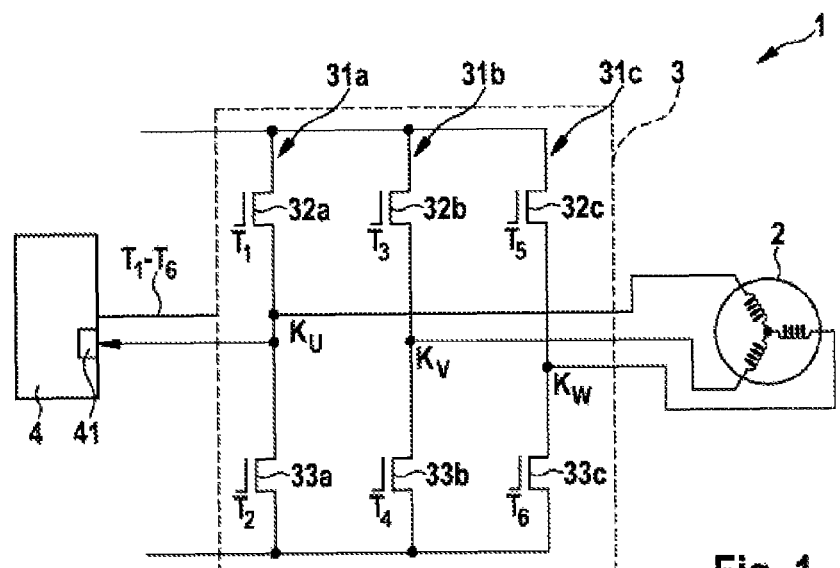
FIG. 1 shows a schematic illustration of a motor system for operating a polyphase electronically commutated electric machine.

FIG. 1 shows a motor system 1 with an electric machine 2. The electric machine 2 is electronically commutated, i.e. alternating phase voltages are applied to winding phases, for example to a stator (not shown), which each comprise one or more coil windings, in order to drive an armature of the electric machine 2. The electric machine 2 is in the form of a synchronous motor, an asynchronous motor or has an otherwise comparable design, for example. In the exemplary embodiment illustrated, the electric machine 2 is a synchronous motor with three winding phases, which comprise star-connected coil windings around stator teeth.

The synchronous motor 2 is driven with the aid of a driver circuit 3. The driver circuit 3 provides, for this purpose, three phase connections $K_U$, $K_V$ and $K_W$, to which respective phase voltage potentials are applied. The phase voltage potentials at the phase connections $K_U$, $K_V$ and $K_W$ are provided by respective inverter circuits 31.

Each of the inverter circuits 31 has a high-side power switch 32 and a low-side power switch 33, which are connected in series. The power switches 32, 33 can be in the form of power MOSFETs, thyristors, IGBTs, IGCTs or the like. The respective phase connection $K_U$, $K_V$ and $K_W$ is located between the two power switches 32, 33. The power switches 32, 33 are driven by control signals $T_1$ to $T_6$.

In detail, a first high-side power switch 32a of a first inverter circuit 31a is driven by a first control signal $T_1$, and a first low-side power switch 33a of the first inverter circuit 31a, which low-side power switch is connected in series with the first high-side power switch 32a, is driven by a second control signal $T_2$. Correspondingly, a second high-side power switch 32b of a second of the inverter circuits 31b is driven by a third control signal $T_3$, and a second low-side power switch 33b of the second inverter circuit 31b is driven by a fourth control signal $T_4$. Correspondingly, a third high-side power switch 32c of a third of the inverter circuits 31c is driven by a fifth control signal $T_5$, and a third low-side power switch 33c is driven by a sixth control signal $T_6$. The driving of the power switches is performed in such a way that said power switches are either switched on or off, i.e. switched to be conducting or nonconducting, depending on the level of the control signal $T_1$ to $T_6$ in question.

The driver circuit 3 is driven by a control unit 4, which provides the control signals $T_1$ to $T_6$. In addition, a voltage detector 41 is provided in the control unit 4 in order to measure a voltage at one or at a plurality of phase connections $K_U$, $K_V$ and $K_W$. In the present exemplary embodiment, the voltage detector 41 measures the phase voltage potential at the phase connection $K_U$.

Figure 2:
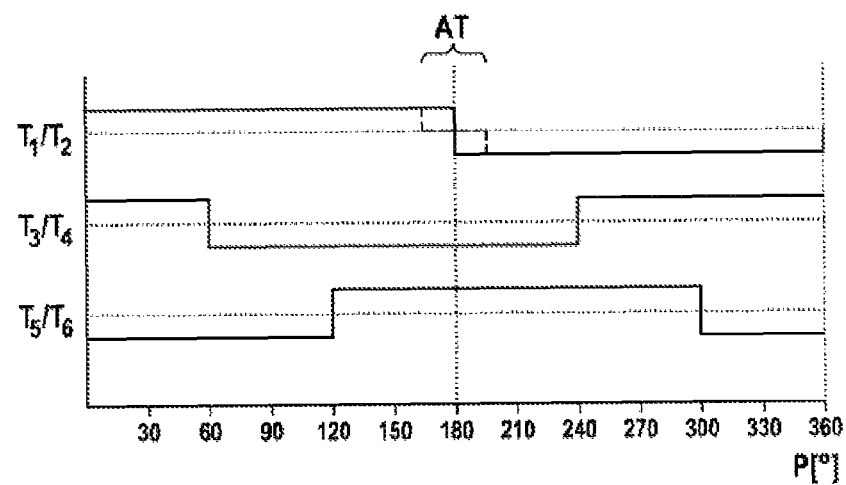
FIG. 2 shows a graph for schematically illustrating the commutation pattern during block commutation for driving the electric machine in accordance with the prior art.

FIG. 2 illustrates a pattern for block commutation, which is implemented by the control unit 4. The control unit 4 drives the inverter circuits 31a, 31b, 31c by inputting the corresponding control signals $T_1$ to $T_6$ in such a way that, depending on the electrical rotor position of the electric machine 2, a positive voltage potential, a negative voltage potential or a floating potential is output at the phase connection in question.

The level of the output phase voltage is given by provision of pulse width modulation, wherein positive phase voltage potentials can be represented by a duty factor of the pulse width modulation of greater than 50%, and negative phase voltage potentials can be represented by a duty factor TV of the pulse width modulation of less than 50%. The pulse width modulation provides cyclic driving of the power switches 32, 33 of the inverter circuits 31a, 31b, 31c with a predetermined cycle time. The duty factor corresponds to the ratio of a switch-on time of the high-side power switch at the predetermined cycle time.

In the case of block commutation, provision is made for a switchover from a positive phase voltage potential to a negative phase voltage potential to take place in the event of changes in the phase angle of 180°. The three inverter circuits 31a, 31b, 31c are driven with a phase shift of 120° with respect to one another, which results in a rotating voltage vector.

As can be seen from the graph in FIG. 2, commutation change needs to take place in each case in phases of 60° with respect to the electrical rotor position. In order that this can take place, knowledge of the instantaneous rotor position needs to be provided. In the case of a sensorless method for operating the synchronous motor 2, the indication of the instantaneous rotor position needs to be determined from electrical variables.

One possible method for detecting the rotor position consists in determining a zero crossing of the profile of the induced back-emf. The induced back-emf at a phase connection can only be determined, however, when no external potential is applied to the phase connection. Therefore, generally, in order to measure the voltage potential at the phase connection for a specific time period and a specific time period after an expected commutation change, both the corresponding high-side power switch 32a, 32b, 32c and the corresponding low-side power switch 33a, 33b, 33c of the inverter circuit 31a, 31b, 31c at which the measurement is intended to take place are deactivated and the resultant voltage potential at the phase connection is determined.

By virtue of the profile of the induced back-emf which is determined within the blanking interval AT provided in such a way, the time of the zero crossing of the induced back-emf can be determined, which time can be associated with a determined electrical rotor position. The time of the zero crossing generally determines the suitable time for the commutation change or the latter is dependent on this. In FIG. 2, the provision of the blanking interval AT of the first inverter circuit 31a is illustrated by dashed lines by way of example.

Figure 3:
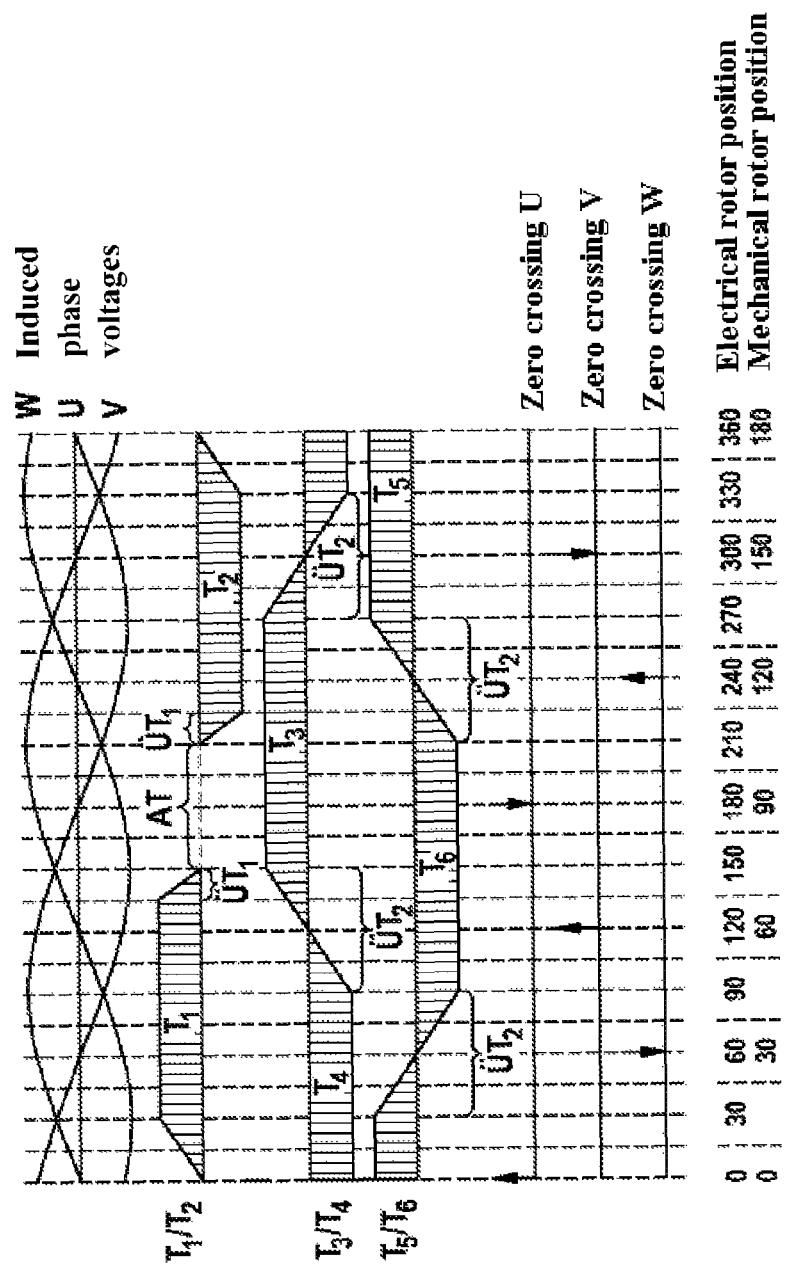
FIG. 3 shows a graph for schematically illustrating commutation in accordance with one embodiment of the present invention with a blanking time window.

The block commutation method for driving a synchronous motor 2 can result in a high level of noise development owing to the sudden changes in the phase voltage potentials at the phase connections $K_U$, $K_V$ and $K_W$. Provision can therefore be made for the transitions to have smaller gradients, as is illustrated in FIG. 3 by way of example. FIG. 3 shows a drive pattern for trapezoidal commutation, wherein the transitions from the application of a positive phase voltage potential to a negative phase voltage potential at one of the phase connections are linear during the second transition time period ÜT2 and vice versa. Such a linear transition generally cannot be combined with a blanking interval AT since the blanking interval AT would cover the regions of the transition between the positive and negative phase voltage potentials.

Provision is therefore made for a blanking interval AT to be provided for at least one of the commutation change operations and for the phase voltage potential to be applied with a gradient which is limited to a predetermined gradient limit value during a first transition time period ÜT1 to result in zero or a floating potential, with the result that a blanking interval AT is provided. This can be used, for example, only for detecting a single zero crossing since this is generally sufficient for the applications with low requirements in terms of dynamics, such as in the case of pumps and fans, for example, in order to determine the remaining commutation change times.

In the present exemplary embodiment shown in FIG. 3, a graph is illustrated in which only the negative zero crossing of the phase connection $K_U$ is used to determine the time of the zero crossing of the induced back-emf. A blanking interval AT of 60° electrical rotor position is provided, for example, wherein a linear transition from a high phase voltage potential (duty factor TV>50%) (TV: duty factor) to a neutral phase voltage potential (duty factor TV=50%) to the respective phase voltage potential to be applied with a limited gradient is provided within a first region of a transition time period (ÜT1) of 15° electrical rotor position prior to the blanking interval AT. Similarly, within a second region of a first transition time period ÜT1 of 15° electrical rotor position after the blanking interval AT, a linear transition from the neutral phase voltage potential (duty factor TV=50%) to a low phase voltage potential (duty factor TV<50%) with a limited gradient is provided. The first and second regions of the first transition time periods ÜT1 are added to in total 30° electrical rotor position.

The remaining transitions between the positive and negative phase voltage potentials of the other inverter circuits 31 and the positive zero crossings are performed during a second transition time period ÜT2 of, for example, 60° electrical rotor position. In the case of a linear transition, the gradient of the change in the duty factor TV corresponds to $$(TV_{prior}-TV_{after})/(ÜT2).$$

The second transition time period does not need to correspond to 60° electrical rotor position, but can also correspond to other position differences.

The transitions between the positive and negative phase voltage potentials in the above embodiments each have a defined predetermined gradient (linear transition), but can also have a transition which has a variable gradient. The magnitude of the gradient should not exceed a specific predetermined gradient threshold value, however.

Typically, the determination of the zero crossing of the induced back-emf is performed in each case after 360° of the electrical rotor position; the determination can also take place in each case after a multiple of 360° of the electrical rotor position, however, with the result that such a time window does not need to be provided in each revolution of the electrical rotor position.

The control unit 4 determines the duty factor change (gradient of the duty factor) dTV/dt which is used for the linear increase and decrease over the transition time period ÜT1 from the required sum of the transition time periods ÜT1 of, for example, 30° electrical rotor position.

$$dTV/dt=(TV_{prior}-TV_{after})/(ÜT1)$$

The following results for the change in the duty factor in successive cycle time periods:

PWM=dTV/dt/(cycle time of the pulse width modulation)

Typically, the matching of or change in the duty factor TV takes place after each elapsed cycle time period of the pulse width modulation. However, multiples of the cycle time duration can also be sufficient for achieving lower loads on the microcontroller provided as control unit. Thus, a microcontroller can be used for realizing the linear commutation transitions.

In the embodiment illustrated in FIG. 3, a linear transition between two phase voltage potentials with different mathematical signs is provided, wherein in the event of the provision of a blanking interval AT, the transition of the phase voltage potential to the floating potential with double the gradient is provided. When using the design of the driver circuit 3, as is illustrated in FIG. 1, therefore, the duty factor is brought back from a positive phase voltage potential to a duty factor of 50% with a predetermined gradient. The high-side power switch 32a and the low-side power switch 33a are then switched so as to be nonconducting in order to realize the blanking interval AT. At the end of the blanking interval AT, the duty factor TV, starting with a duty factor of 50%, is reduced further in accordance with the predetermined gradient down to the duty factor TV at which the desired negative phase voltage potential is applied to the phase connection in question.

As explained above, the duty factor of the pulse width modulation is changed with respect to a duty factor of 50% in the positive and negative direction. However, given a very low duty factor, clocking of the pulse width modulation then still takes place, with the result that the low-side power switch 33a, 33b, 33c never switches to ground for a relatively long period of time. As a result, in particular at high powers, the charge pump for the high-side power switch is insufficiently recharged. For this case, in total the lowest duty factor arising of the pulse width modulation is deducted as an offset value and therefore the low-side power switches are switched permanently to ground in the negative energization phases. This improves the recharging of the charge pump considerably. At the phase voltage potential, therefore, sufficient times arise in which recharging of the charge pump takes place.

The invention claimed is:

1. A method for operating an electronically commutated electric machine, the method comprising:
    applying alternating phase voltage potentials to the winding phases of the electric machine for commutation, wherein the phase voltage potentials are generated by pulse width modulation, and the level of the phase voltage potential applied is determined by a duty factor of the pulse width modulation, and
        determining a time for a zero crossing of a voltage induced in a winding phase by, at least in part, providing a blanking interval (AT), wherein the blanking interval represents a time window during which no phase voltage potential is applied to the corresponding winding phase,
    wherein, prior to and/or after providing the blanking interval, a first transition time period is provided, during which the profile of the applied phase voltage potential has a limited first gradient.

2. The method as claimed in claim 1, wherein the phase voltage potential has a linear profile during the transition time period.

3. The method as claimed in claim 1, wherein the phase voltage potentials are applied in accordance with block commutation, wherein, in the event of each change between phase voltage potentials during a second transition time period, the profile of the applied phase voltage potential has a limited second gradient.

4. The method as claimed in claim 3, wherein the second gradient of the phase voltage potentials has a smaller magnitude than the first gradient of the phase voltage potentials.

5. The method as claimed in claim 1, wherein, during the first transition time period, the profile of the phase voltage potential starts from a mid-voltage potential or ends at the mid-voltage potential, wherein the mid-voltage potential is determined as the mean value for the phase voltage potentials prior to and after the blanking interval provided with the transition time periods.

6. An apparatus for operating an electronically commutated electric machine, the apparatus comprising a control unit configured
    to apply alternating phase voltage potentials to the winding phases of the electric machine for commutation,
    to generate the phase voltage potentials by pulse width modulation, with the result that the level of the applied phase voltage potential is determined by a duty factor of the pulse width modulation,
    to provide a blanking interval for determining a time of a zero crossing of a voltage induced in a winding phase, said blanking interval representing a time window during which no phase voltage potential is applied to the corresponding winding phase, and
    to provide a first transition time period prior to and/or after the blanking interval, during which first transition time period the profile of the applied phase voltage potential has a limited first gradient.

7. A motor system comprising an electronically commutated electric machine and an apparatus as claimed in claim 6.

8. A computer program product which contains a program code which, when it is run on a data processing device, implements the method as claimed in claim 1.

* * * * *